INVENTOR
Joseph Rebhen.

Patented Nov. 4, 1941

2,261,661

UNITED STATES PATENT OFFICE 2,261,661

PROTECTIVE MEANS FOR ELECTRICAL APPARATUS

Joseph Rebhan, Nuremberg, Germany, assignor to Westinghouse Electric & Manufacturing Company, East Pittsburgh, Pa., a corporation of Pennsylvania Application November 1, 1938, Serial No. 238,187
In Germany November 2, 1937

6 Claims. (Cl. 175—294)

The present invention relates to protective means for electrical apparatus, and, more particularly, to an arrangement for the protection of electrical apparatus against lightning, or other voltage surges.

In some cases electrical apparatus, such as a transformer, connected to a high voltage transmission line is protected against lightning or voltage surges caused by switching operations by means of an overvoltage discharge device or lightning arrester connected across the apparatus so as to bypass the voltage surge and thus prevent injury to the apparatus. When this arrangement is used, if the arrester fails to interrupt the discharge when the voltage surge has passed and permits the continued flow of current, the protected apparatus is short-circuited through the arrester and a heavy current may flow in the circuit thus formed, resulting in serious damage to the apparatus.

It is the object of the present invention to provide a protective arrangement using a by-pass lightning arrester in which failure of the arrester will not result in damage to the protected apparatus.

More specifically, the object is to provide a protective arrangement using a bypass lightning arrester of a type which has an external discharge path for the ionized gas produced by the discharge, and in which the arrester is so arranged that the discharge path of the ionized gas extends to a conducting part of the apparatus. With the arrester arranged in this way, continued flow of current through it will result in ionization of the air through which the discharge path passes and permit a flow of current to another conducting part of the apparatus which will be great enough to cause operation of a protective relay and disconnect the apparatus from the line.

Figure 1:
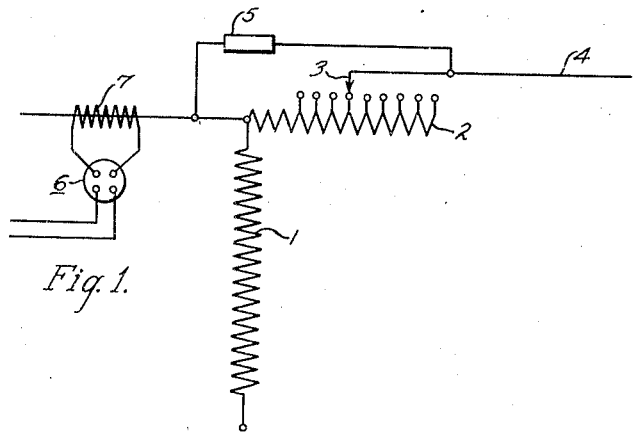
Figure 2:
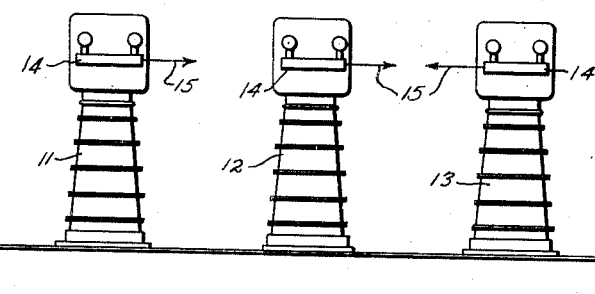
Figure 3:
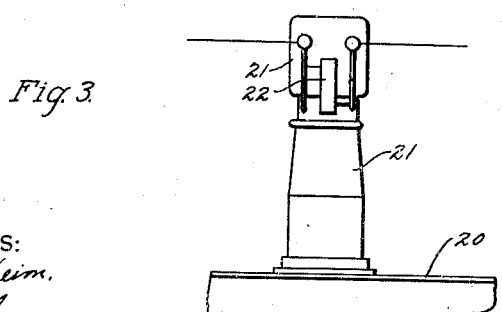

Other objects and advantages of the invention will be apparent from the following detailed description, taken in connection with the accompanying drawing, in which:

Figure 1 is a single line diagram showing a typical circuit arrangement with which the invention may be used, Fig. 2 is a partial elevation of a transformer showing one embodiment of the invention, and Fig. 3 is a fragmentary view similar to Fig. 2 showing another embodiment of the invention.

Figure 1 shows diagrammatically a typical arrangement for a booster or regulating transformer having a main winding 1 and an auxiliary regulating winding 2 provided with a tap changing switch 3 and connected in series with a transmission line 4. In order to protect the winding 2 against lightning or other voltage surges, an overvoltage discharge device or lightning arrester 5 is connected across the winding so as to bypass voltage surges around it. A protective relay 6 is connected to the transmission line 4 through a current transformer 7 and is arranged to cause operation of a circuit breaker and disconnect the transformer from the line. This relay may be of any usual type and is arranged to protect the transformer against overload or against any of the usual types of faults, such as ground faults, and it is, accordingly, made responsive to excess current, ground current or any other quantity, according to the type of protection desired, in the usual manner.

With this arrangement it will be seen that if the arrester 5 fails to interrupt the discharge after the voltage surge has passed and permits a continued flow of current, the winding 2 will be short-circuited through the arrester, and a very heavy current may flow in the circuit thus formed as a result of the voltage induced in the winding 2 by the main winding 1, resulting in serious damage to the winding. Because of the relatively high ratio of transformation between the windings 1 and 2 which is usually found in a transformer of this type, the corresponding current in the winding 1 will usually not be great enough to cause operation of the relay 6 until serious damage has occurred in the winding 2. For this reason, it is desirable to provide an arrangement such that failure of the lightning arrester will result in operation of the relay to disconnect the transformer from the line before the winding 2 can be damaged by the short-circuit current.

This result is obtained in the present invention by using a lightning arrester of a type in which the discharge is extinguished by moving it outwardly of the arrester, or in which the arrester has a discharge path extending outwardly beyond its casing as in the well known protector tube, in which the discharge takes place in a tube of material such as hard fiber which evolves large quantities of deionizing gas when subjected to an electric arc so that the ionized gas produced by the discharge is blown out of the tube. By mounting such an arrester in a position so that the discharge path of the ionized gas extends to a conducting part of the protected apparatus which is normally insulated from the part of the apparatus to which the arrester is connected, continued operation of the arrester will cause ionization of the air and provide a conducting path extending between the two parts of the apparatus, so that a circuit will be established through which sufficient current will flow to cause immediate operation of the protective relay.

One embodiment of the invention is shown in Fig. 2 which shows the upper portion of a transformer contained in a tank or housing 10, on the top of which are mounted three terminals or bushings 11, 12 and 13. The transformer shown in this figure is a three-phase regulating transformer and a lightning arrester 14 is provided for the protection of each phase and connected as shown in Fig. 1. These arresters may conveniently be mounted directly on the upper part of the terminals and are preferably of the type described above, in which ionized gas is discharged from the arrester, as indicated by the arrows 15. As will be seen from Fig. 2, each arrester is mounted on its terminal in such a position that its discharge path extends in the direction of the adjacent terminal. Thus, if the arrester fails to interrupt the current flowing through it after a voltage surge has passed, the continued discharge extending towards the adjacent terminal will ionize the intervening air and provide a conducting path between the terminals. This has the same effect as a direct short-circuit between the terminals and cause immediate operation of the protective relay in response to the short-circuit current, thus disconnecting the transformer from the line before any damage can occur as a result of the failure of the lightning arrester.

Another arrangement embodying the invention is shown in Fig. 3, which shows the upper portion of a transformer contained in a tank 20 and having a terminal 21 mounted on the tank. It will be understood, of course, that this may be either a single phase or a three-phase transformer, although only one terminal has been shown in the drawing. A lightning arrester 22 is mounted on the top of the terminal in a similar manner to the arresters shown in Fig. 2, and is of a similar type. In this case, however, the arrester is mounted in a vertical position with its discharge path extending downwards towards the tank of the transformer. In case of failure of the arrester, the continued discharge will ionize the air intervening between the arrester and the top of the tank 20. Since it is customary to ground transformer tanks, this will cause a flow of current to ground, and have the same effect as a ground fault in the transformer. When this arrangement is used, the protective relay should be arranged to operate in response to ground fault current, and it will be seen that failure of the lightning arrester will cause immediate operation of the relay to disconnect the transformer from the line before any damage can occur to the windings.

In case the construction of the transformer is such that the lightning arrester cannot be mounted so that the discharge path extends directly towards the tank, or if the height of the terminal bushing is so great that the distance between the arrester and the top of the tank is too great for the air to be ionized in this manner, an auxiliary conducting member can be secured to the top of the tank and extend into the discharge path of the arrester so that the same effect is obtained.

The invention has been described above as applied to the protection of transformers, but it is to be understood that it is not limited to this particular application. Thus, it can equally well be applied to the protection of capacitor banks connected to transmission lines for power factor connection, or to any other electrical instrumentality which it is desired to protect against voltage surges in this manner. In general, it may be said that the invention is applicable in any circumstances in which failure of a lightning arrester or overvoltage discharge device will subject the protected apparatus to the possibility of damage from short-circuit currents flowing through the arrester. In any such case, the arrester can be arranged in the manner described above in order to cause disconnection of the protected apparatus from its circuit before serious damage can occur.

It will be seen, therefore, that a very simple but highly effective arrangement has been provided by which a bypass arrester can be used for the protection of electrical apparatus without the usual danger of serious damage resulting from failure of the arrester. It should also be understood that the invention is not limited to the particular arrangement described, but that the arrester may be arranged in any desired manner so that continued flow of current will result in ionization of the air in the discharge path of the arrester, and provide a conducting path which will have the effect of permitting a sufficient current to flow in some part of the protected apparatus to cause operation of a protective relay.

Although certain specific embodiments of the invention have been illustrated and described, it is to be understood that it is not limited to the exact arrangement shown but that, in its broadest aspects, it includes all equivalent arrangements and embodiments which come within the scope of the appended claims.

I claim as my invention:

1. A transformer having a main winding and an auxiliary winding connected in series with a transmission line, an overvoltage discharge device of a type in which the ionized gas produced by the discharge passes out of the device, said device being connected across the auxiliary winding and mounted on the transformer in such a position that the external path of said ionized gas extends to a conducting part of the transformer connected to the main winding, and an overcurrent relay for disconnecting the transformer from the line.

2. A transformer having a main winding and an auxiliary winding connected in series with a transmission line, an overvoltage discharge device of a type in which the ionized gas produced by the discharge passes out of the device, said device being connected across the auxiliary winding and mounted on the transformer in such a position that the external path of said ionized gas extends to a grounded part of the transformer, and a ground fault responsive relay for disconnecting the transformer from the line.

3. Protective means for an electrical instrumentality connected in a transmission or distribution line comprising an overvoltage discharge device connected across said instrumentality or a part thereof to temporarily short-circuit it during the existence of a voltage surge on the line, said discharge device being of a type in which ionized gas produced by the discharge passes out of the device and being mounted so that continued flow of said ionized gas as a result of failure of the device to interrupt the discharge after termination of a voltage surge causes a current to flow between parts of said instrumentality which are normally insulated from each other, and means responsive to said current for disconnecting the instrumentality from the line.

4. Protective means for an electrical instrumentality connected in a transmission or distribution line comprising an overvoltage discharge device connected across said instrumentality or a part thereof to temporarily short-circuit it during the existence of a voltage surge on the line, said discharge device being of a type in which ionized gas produced by the discharge passes out of the device and being mounted on said instrumentality in such a position that the external path of said ionized gas extends to a conducting part of the instrumentality which is normally insulated from the part to which the discharge device is connected, whereby continued flow of ionized gas as a result of failure of the discharge device to interrupt the discharge after termination of a voltage surge causes current to flow between said parts, and means responsive to said current for disconnecting the instrumentality from the line.

5. Protective means for an electrical instrumentality connected in a transmission or distribution line comprising an overvoltage discharge device connected across said instrumentality or a part thereof to temporarily short-circuit it during the existence of a voltage surge on the line, said discharge device being of a type in which ionized gas produced by the discharge passes out of the device and being mounted on a terminal of the instrumentality in such a position that the external path of said ionized gas extends to a second terminal of the instrumentality, whereby continued flow of said ionized gas as a result of failure of the discharge device to interrupt the discharge after termination of a voltage surge causes a short-circuit current to flow between said terminals, and means responsive to said current for disconnecting the instrumentality from the line.

6. Protective means for an electrical instrumentality connected in a transmission or distribution line comprising an overvoltage discharge device connected across said instrumentality or a part thereof to temporarily short-circuit it during the existence of a voltage surge on the line, said discharge device being of a type in which ionized gas produced by the discharge passes out of the device and being mounted on a terminal of the instrumentality in such a position that the external path of said ionized gas extends to a grounded part of the instrumentality, whereby continued flow of said ionized gas as a result of failure of the discharge device to interrupt the discharge after termination of a voltage surge causes a flow of current to ground, and means responsive to said current for disconnecting the instrumentality from the line.

JOSEPH REBHAN.